United States Patent
Tremonti

(10) Patent No.: US 9,159,230 B2
(45) Date of Patent: *Oct. 13, 2015

(54) VEHICLE COMMUNICATION SYSTEM

(71) Applicant: Mark Tremonti, Windermere, FL (US)

(72) Inventor: Mark Tremonti, Windermere, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/101,935

(22) Filed: Dec. 10, 2013

(65) Prior Publication Data

US 2014/0300493 A1    Oct. 9, 2014

Related U.S. Application Data

(63) Continuation of application No. 12/714,012, filed on Feb. 26, 2010, now Pat. No. 8,604,940.

(51) Int. Cl.
| | |
|---|---|
| *G08G 1/00* | (2006.01) |
| *G08G 1/0965* | (2006.01) |
| *B60Q 1/50* | (2006.01) |
| *B60Q 1/46* | (2006.01) |
| *B60Q 1/52* | (2006.01) |
| *G08G 1/127* | (2006.01) |

(52) U.S. Cl.
CPC ............. *G08G 1/0965* (2013.01); *B60Q 1/46* (2013.01); *B60Q 1/50* (2013.01); *B60Q 1/52* (2013.01); *G08G 1/127* (2013.01); *G08G 1/205* (2013.01)

(58) Field of Classification Search
CPC ............. B60Q 1/46; B60Q 1/50; B60Q 1/52
USPC .......... 340/901, 471, 473, 902, 463, 468, 472
See application file for complete search history.

(56) References Cited

U.S. PATENT DOCUMENTS

| | | | | |
|---|---|---|---|---|
| 3,274,548 | A * | 9/1966 | Brimsek | 340/473 |
| 3,635,189 | A * | 1/1972 | Whittemore | 102/343 |
| 4,631,516 | A * | 12/1986 | Clinker | 340/464 |
| 4,751,494 | A * | 6/1988 | Crotwell | 340/473 |
| 5,053,746 | A * | 10/1991 | Taneo | 340/473 |
| 5,426,414 | A * | 6/1995 | Flatin et al. | 340/472 |
| 5,663,706 | A * | 9/1997 | Francis | 340/464 |
| 5,825,281 | A * | 10/1998 | McCreary | 340/425.5 |
| 5,905,434 | A * | 5/1999 | Steffan et al. | 340/464 |
| 6,124,783 | A * | 9/2000 | Alexander | 340/426.12 |
| 6,175,977 | B1 * | 1/2001 | Schumacher et al. | 5/626 |
| 6,178,677 | B1 * | 1/2001 | Williams | 40/593 |
| 6,195,000 | B1 * | 2/2001 | Smith et al. | 340/471 |
| 6,268,793 | B1 * | 7/2001 | Rossi | 340/471 |
| 6,304,174 | B1 * | 10/2001 | Smith et al. | 340/471 |
| D478,935 | S * | 8/2003 | Gearhart et al. | D20/10 |
| 6,812,851 | B1 * | 11/2004 | Dukach et al. | 340/815.4 |
| 7,397,356 | B1 * | 7/2008 | Johnson | 340/471 |

(Continued)

*Primary Examiner* — Ariel Balaoing
*Assistant Examiner* — Kam Ma
(74) *Attorney, Agent, or Firm* — Akerman LLP

(57) ABSTRACT

A vehicle communication system including a communications link and optionally a vehicle position indicator provided at a facility. A visual indicator is provided that is attachable to or usable in a non-official passenger vehicle to alert other road users that a vehicle is traveling in an emergency situation. A communications link and optionally a vehicle position locator are also attachable to or usable in a non-official passenger vehicle to communicate with the facility to alert the facility that the vehicle is traveling to the facility in an emergency situation. The visual indicator may be a flashing light, or a lighted warning message or symbol, and may be a one-time use light or may be operable only after receipt of an activation code from the facility.

10 Claims, 2 Drawing Sheets

(56) References Cited

U.S. PATENT DOCUMENTS

| | | | |
|---|---|---|---|
| 7,825,790 B2* | 11/2010 | Tallinger | 340/472 |
| 8,136,280 B2* | 3/2012 | Spelman | 40/586 |
| 2003/0060808 A1* | 3/2003 | Wilk | 606/1 |
| 2003/0128121 A1* | 7/2003 | Nee | 340/573.1 |
| 2004/0075539 A1* | 4/2004 | Savoie et al. | 340/426.1 |
| 2007/0008174 A1* | 1/2007 | Schwartz | 340/902 |
| 2007/0096892 A1* | 5/2007 | Nathan et al. | 340/471 |
| 2009/0199762 A1* | 8/2009 | Elam | 116/28 R |
| 2011/0210864 A1* | 9/2011 | Tremonti | 340/902 |
| 2011/0291858 A1* | 12/2011 | Huppertz | 340/901 |
| 2012/0013459 A1* | 1/2012 | Giangrande | 340/468 |

* cited by examiner

VEHICLE COMMUNICATION SYSTEM

CROSS-REFERENCE TO RELATED APPLICATIONS

This application is a continuation of U.S. patent application Ser. No. 12/714,012, filed on Feb. 26, 2010, which is hereby incorporated by reference in its entirety.

BACKGROUND OF THE INVENTION

1. Field of the Invention

The present invention relates to a vehicle communication system designed to allow a driver of a vehicle to let other road users and a medical or other facility know that the driver is traveling in an emergency situation.

2. Description of the Related Art

Emergency or other types of official vehicles have well-known methods of letting other road users know that they are traveling in an emergency situation. These typically include powerful flashing lights and sirens that alert other road users to yield to the emergency vehicle. However, there is at present no way for a non-emergency or non-official vehicle, such as a passenger car, to let other road users know that an emergency exists and that the car is traveling in an emergency situation and preferably should be allowed priority and courtesy on the road.

There are various situations in which a person traveling in a passenger car, or other non-official vehicle may have a legitimate emergency situation in which it is desirable for them to be able to travel quickly to seek medical or other help. It is not always convenient, necessary or desirable for such a person to have to wait for a medical transport vehicle, such as an ambulance, to transport them to a medical facility. Various medical situations are relatively predictable in advance, and a vehicle user who knows that such a situation could arise could benefit from a predetermined arrangement with law enforcement and/or medical personnel to allow them to travel with systems to alert other road users to an emergency situation. Some situations that may arise to allow for someone to qualify for such an arrangement include imminent childbirth, chronic medical conditions that may have emergent episodes, potential recipients on organ transplant waiting lists, and the like.

It is desirable to provide an alternative solution to members of the public to alert others that they are driving in an emergency situation.

SUMMARY OF THE INVENTION

According to an arrangement of the present invention, a vehicle communication system is disclosed. The vehicle communication system includes a communications link and optionally a vehicle position indicator provided at a facility. A visual indicator is provided that is attachable to or usable in a non-official passenger vehicle to alert other road users that a vehicle is traveling in an emergency situation. A communications link and optionally a vehicle position locator are also attachable to or usable in a non-official passenger vehicle to communicate with the facility to alert the facility that the vehicle is traveling to the facility in an emergency situation.

The visual indicator may be a flashing light, or a lighted warning message or symbol, and may be a one-time use light or may be operable only after receipt of an activation code from the facility. The visual indicator can include at least one of OLED and LED light bulbs, and/or can comprise chemiluminescent materials.

In some arrangements, the visual indicator is in communication with the communications link, and is operable only after receipt of an activation code from the facility. The visual indicator in some arrangements is activatable by a user at any time after receipt of the activation code from the facility. Alternatively, or in addition, the visual indicator can be activatable by the facility while the user is traveling.

In another arrangement of the invention, a method of communicating to road users includes the steps of providing at least one of a communications link and a vehicle position indicator provided at a facility, and providing at least one of a communications link and a vehicle position locator attachable to or usable in a non-official passenger vehicle to communicate with the at least one of a communications link and a vehicle position indicator provided at the facility to alert the facility that the vehicle is traveling to the facility in an emergency situation. A visual indicator is provided which is attachable to or usable in a non-official passenger vehicle to alert other road users that a vehicle is traveling in an emergency situation. The visual indicator is activated such that the vehicle user can only use the visual indicator once before either obtaining another visual indicator or receiving an activation code from the facility.

In the various arrangements, the communications link is provided at a law enforcement, emergency or emergency-associated facility.

BRIEF DESCRIPTION OF THE DRAWINGS

There are shown in the drawings arrangements which are presently discussed, it being understood, however, that the invention is not limited to the precise arrangements and instrumentalities shown, wherein.

DETAILED DESCRIPTION OF THE DRAWINGS

Figure 1:
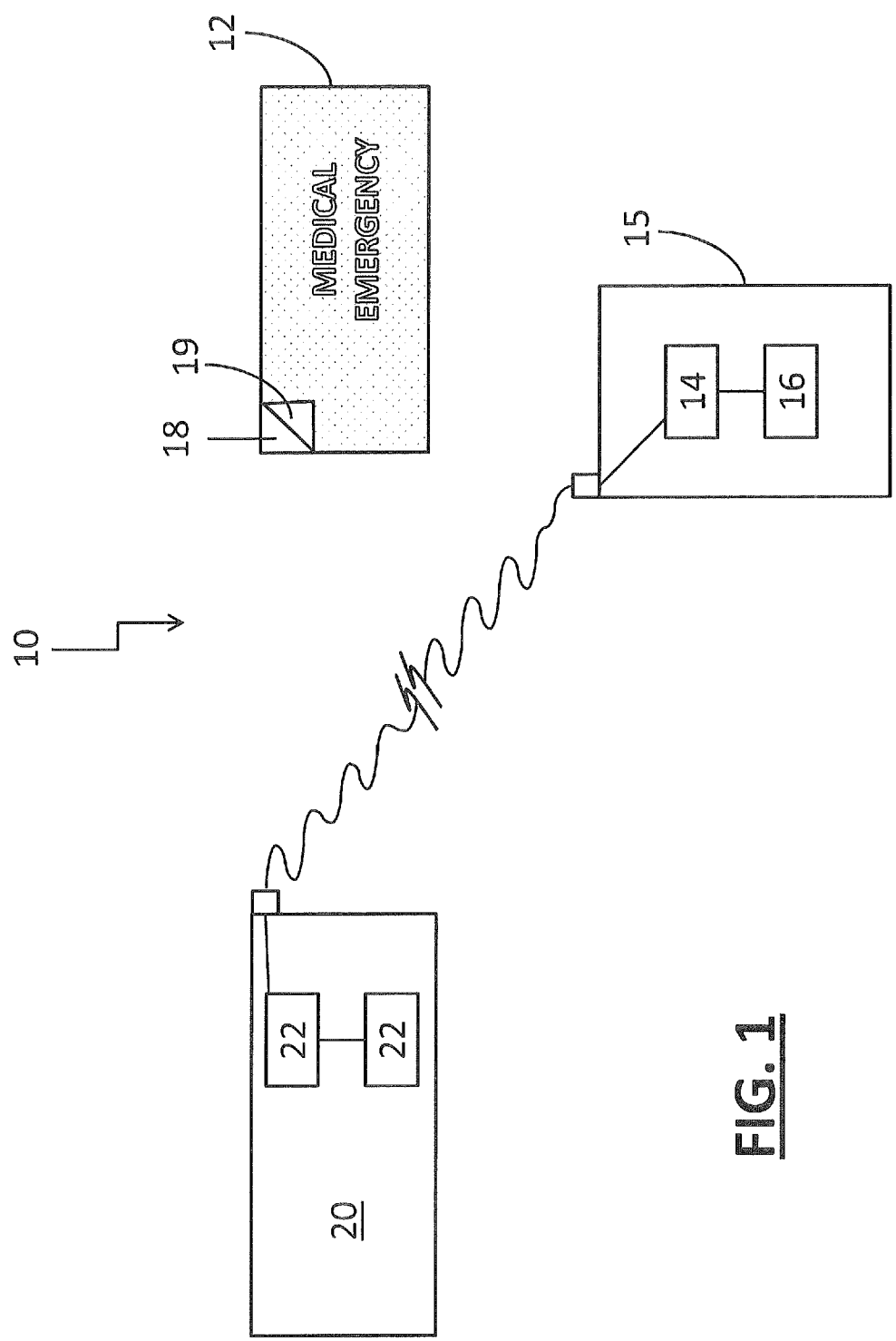
FIG. 1 is a schematic view of an arrangement of a vehicle communication system according to the present invention.
Figure 2:
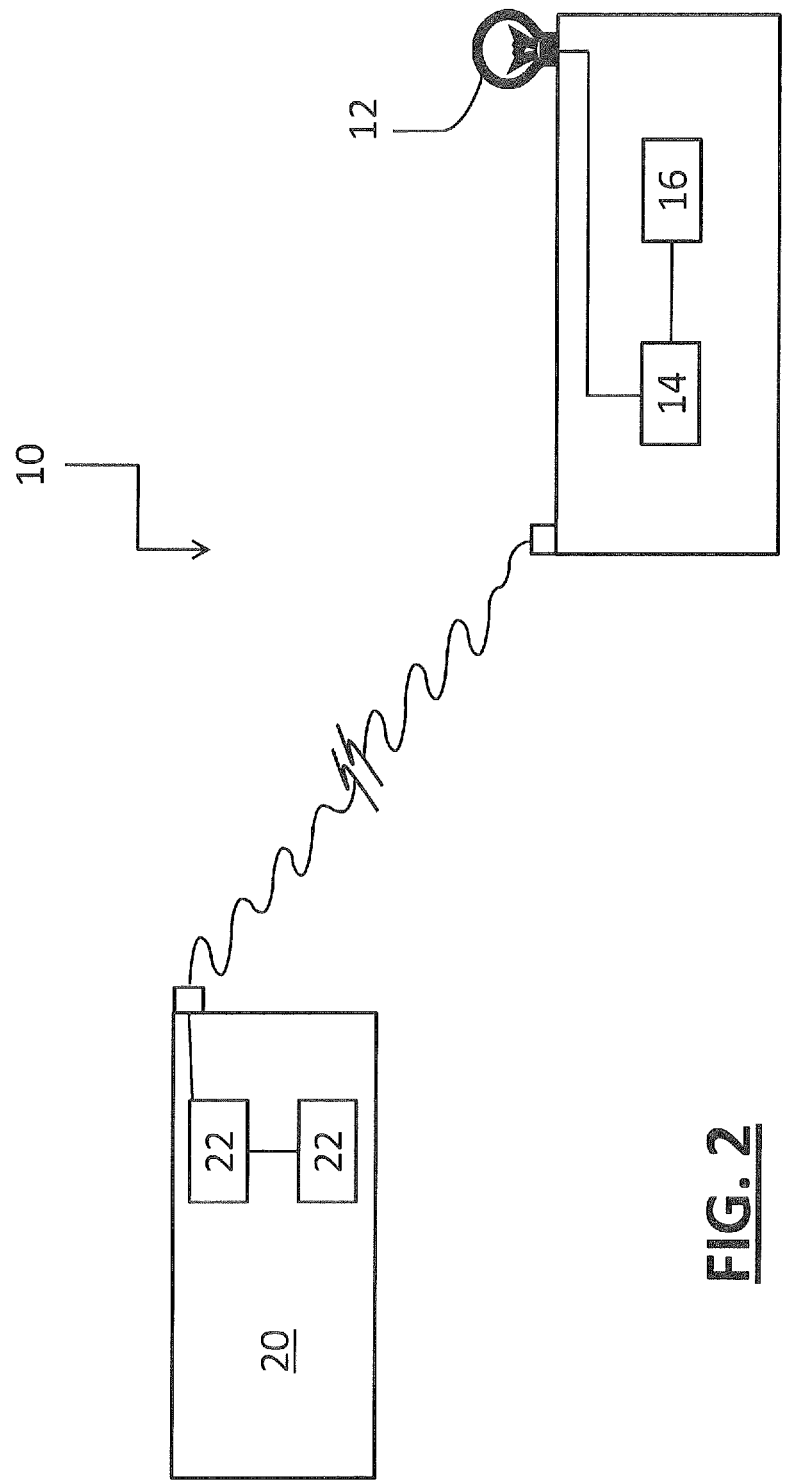
FIG. 2 is a schematic view of another arrangement of a vehicle communication system according to the present invention.

The present invention is directed to a vehicle communication system designed to allow a driver of a vehicle to let other road users and a medical or other facility know that the driver is traveling in an emergency situation.

There are various situations in which a person traveling in a passenger car, or other non-official vehicle may have a legitimate emergency situation in which it is desirable for them to be able to travel quickly to seek medical or other help. Many of these situations are relatively predictable in advance, and the vehicle user could benefit from a predetermined arrangement with law enforcement and/or medical personnel to allow them to travel with systems to alert other road users to an emergency situation. Some situations that may arise to allow for someone to qualify for such an arrangement include imminent childbirth, chronic medical conditions that may have emergent episodes, potential recipients on organ transplant waiting lists, and the like.

The vehicle communication system according to the present invention may require permission from local law enforcement officials to be operated, and is not intended to allow users of the system to circumvent any traffic laws. For example, it is not intended that a user of the system would travel at speeds that are faster than the posted speed limit on a particular road, or that a user of the system would drive through red traffic lights or stop signs, similar to the privileges afforded to drivers of emergency vehicles. Rather, it can operate as signal to other road users that the vehicle operator is requesting the courtesy of other road users to yield or give way to the vehicle using the system.

The vehicle communication system 10 can include a visual indicator 12, a communications link 14, and in some arrangements, a vehicle locator system 16. The communications link 14 can be arranged to communicate with a facility system 20.

The visual indicator 12 can be one of a flashing light (for example, an orange, white, yellow or other color light that would not be associated with emergency services or medical personnel as blue, red, or green may be), a lighted or flashing warning message such as "medical emergency" or other wording, a lighted or flashing warning symbol, or any other light-based indicator to other road users. In order to differentiate the visual indicator 12 from emergency vehicles, in one arrangement the lighted message or symbol is permanently lit, and does not flash. In other arrangements, flashing lights may be provided. The visual indicator 12 can be provided as a reusable light that can be placed in the front or rear windscreen, in the side windows or on top of the vehicle. The visual indicator 12 does not need to provide as powerful an illumination as a typical official vehicle such as a police car or ambulance. Thus, the visual indicator 12 can be battery powered, or connected to the vehicle's 12V power system. In preferred arrangements, the visual indicators can include OLEDs, LEDs, or other compact bulbs such as halogen bulbs. For increased visibility, retroreflective and fluorescent materials can be included in the visual indicator 12. The visual indicator 12 can be provided with suction cups, an adhesive film, hooks, bungee cords, or any other suitable means of attachment to the vehicle.

In one arrangement, the visual indicator 12 can be a one-time use sign or indicator, or a pseudo one-time use indicator. An advantage of a one-time use indicator is that it discourages the vehicle user from mis-using or abusing the vehicle communication system 10 by using it in situations that are not really medical emergencies. Such a system can reassure law enforcement officials that the visual indicator 12 can be trusted, and can therefore be permitted to operate on public roads. The one-time use feature can be a pseudo one-time use feature in that the indicator 12 can be designed to be reused, but it includes a programming code built in to the visual indicator 12 that can only be operated by the medical facility system 20, or another system. The visual indicator can be programmed to operate only once after it has been activated by the medical facility system 20, until it is returned to the medical facility, or the user contacts the medical facility and asks them to remotely reactivate the visual indicator 12. Thus, the user does not have the authority to reset the programming code to allow unrestricted use. Alternatively, the visual indicator 12 can be a true one-time use, or disposable indicator. For example, the visual indicator 12 can be lit, for example, with chemical luminescence or electroluminescence that is only designed to be operated once.

In yet another arrangement, the visual indicator 12 can be operated only by the medical facility system 20. This can be done after the communications link 14 has been activated, and the driver of the vehicle has spoken to personnel at the medical facility. Once the medical facility personnel have verified that a true medical emergency exists, they can remotely activate the visual indicator 12. Again, this provides an advantage in that it discourages the vehicle user from mis-using or abusing the visual indicator 12 by using it in situations that are not really medical emergencies, and can reassure law enforcement officials as to the veracity of the usage of the visual indicator 12.

In one arrangement, the visual indicator 12 can be provided on a flexible, transparent film 18 that is adhered to the interior surface of one or more of the vehicle's windows, by peeling off a backing sheet 19 to reveal an adhesive layer. The visual indicator 12 can include printed wording such as "medical emergency" that can be lit by, for example, OLEDs, LEDs, and/or other electroluminescent, chemiluminescent, and/or phosphorescent materials.

The communications link 14 and the vehicle locator system 16 can be provided separately, or can be part of one device. For example, they can be provided within a vehicle-based device which also incorporates the visual indicator 12, or they can alternatively be provided separately from the visual indicator 12. In one arrangement, both the vehicle locator system 16 and the communications link 14 can be provided on a position-locating enabled smart phone 15. In another arrangement, the communications link 14 can be provided as part of a mobile telephone or smart phone, with the vehicle locator system 16 can be a pre-installed GPS system in the vehicle. In the arrangement where the vehicle system 10 comprising the communications link 14, vehicle locator system 16 and visual indicator 12 are provided in a single discrete unit, this unit may be provided to a user by a medical facility on a temporary or rental basis, until the need for its use is no longer necessary, when it can be provided to a different user. The unit may be placed onto the dashboard or rear parcel shelf of the vehicle so that the visual indicator 12 may be seen by other road users, but the occupants of the car can also operate the communications link 14 from the interior of the vehicle.

The facility system 20 can be located at a hospital, police department, fire station, doctors office, or any other facility that may have arranged with their patient or user population to allow use of the communication system 10. The facility system 20 is set up to receive incoming communications from the communications link 14, for example, using the cellular telephone network via a communications link 22. These incoming communications may include but are not limited to (1) an initial communication that the user has turned on their communication system 10 and is traveling to the facility; (2) position information from the vehicle locator system 16 to alert staff at the facility as to the approximate location of the vehicle bearing the communication system 10, via a vehicle position indicator 24; (3) approximate time to arrival of the vehicle bearing the communication system 10 at the facility. The approximate time to arrival can be calculated based on the position of the vehicle, the speed at which the vehicle is traveling and any known road conditions or other speed limits that are applicable. The facility system 20 may display a map showing the location of the vehicle at any time after activation of the communications link 14.

The communications link 14 may also be set up for hands-free voice communication so that the driver or passenger of the vehicle can talk to medical or law enforcement personnel while traveling. The voice communication may use standard cellular telephone services, such as bluetooth, or a car-based system such as On-Star® or the like. Voice communication can be very useful to allow the driver to relay information about the patient's condition to medical staff, to allow medical staff to provide information or ask questions, to calm the driver and patient, and even to provide directions if the driver is unsure of the best route to the medical facility, due to traffic or other road impediments.

As previously indicated, the vehicle communication system 10 provides advantages to the user in alerting other road users to the desirability of extending courtesy to the driver traveling in an emergency situation. It can also alert law enforcement officers as to the condition of the vehicle. It also alerts a medical facility that the user is traveling, and in some arrangements, provides the position of the user to the medical facility. These features can greatly reduce stress on the driver of the vehicle, as they can be supported on their journey to the medical facility, calmed if necessary by instructions or questions from the medical staff, and can feel that they are warning other road users of their need to proceed in an unimpeded and quick manner to the medical facility. This reduction in stress can improve safety by allowing the driver to concentrate on the road conditions and on driving safely. The medical staff can also prepare for the patient's arrival and can obtain valuable information while the patient is in-transit.

It should be understood that the examples and arrangements described herein are for illustrative purposes only and that various modifications or changes in light thereof will be obvious to persons skilled in the art, and that such modifications or changes are to be included within the spirit and purview of this application. Moreover, the invention can take other specific forms without departing from the spirit or essential attributes thereof.

What is claimed is:

1. A vehicle communication system comprising:
    a communications link provided at a facility, wherein the facility is at least one of a law enforcement facility, medical facility, fire department or medical transport facility;
    a visual indicator attachable to or usable in a non-official passenger vehicle to alert other road users that the vehicle is traveling in an emergency situation, wherein the visual indicator is in addition to the vehicle's standard running lights;
    a communications link attachable to or usable in the vehicle and selectively operable by a passenger in the vehicle to communicate with the communications link provided at the facility,
    wherein the visual indicator is in communication with the communications link at the facility, and is activatable by the passenger in the vehicle only after receipt of an activation code transmitted via the communications link from the facility.

2. The vehicle communication system according to claim 1, wherein the visual indicator comprises at least one of OLED and LED light bulbs.

3. The vehicle communication system according to claim 1, wherein the visual indicator comprises chemiluminescent materials.

4. The vehicle communication system according to claim 1, wherein the visual indicator is a one-time use indicator.

5. The vehicle communication system according to claim 1, wherein the visual indicator is activatable by the passenger in the vehicle at any time after receipt of the activation code from the facility.

6. The vehicle communication system according to claim 1, wherein the visual indicator, and the communications link provided in or for the vehicle are provided in a single unit.

7. The vehicle communication system according to claim 1, wherein the visual indicator is provided separately from the communications link provided in or for the vehicle.

8. The vehicle communication system according to claim 1, wherein the communications link provided in or for the vehicle is provided on a smart phone.

9. A method of communicating to road users comprising the steps of:
    providing a communications link at a facility, wherein the facility is at least one of a law enforcement facility, medical facility, fire department or medical transport facility;
    providing a communications link attachable to or usable in a non-official passenger vehicle and selectively operable by a passenger in the vehicle to communicate with the communications link provided at the facility to alert the facility that the vehicle is traveling to the facility in an emergency situation;
    providing a visual indicator attachable to the vehicle to alert other road users that the vehicle is traveling in an emergency situation, wherein the visual indicator is in addition to the vehicles standard running lights; and
    activating the visual indicator, the visual indicator being selectively operable by the passenger in the vehicle, wherein the visual indicator is in communication with the communications link provided at the facility, and is activatable by the passenger in the vehicle only after receipt of an activation code transmitted via the communications link from the facility.

10. The vehicle communication system according to claim 1, further comprising a vehicle position indicator provided at the facility in communication with the communications link provided in or for the vehicle to indicate the position of the vehicle to the facility.

* * * * *